United States Patent
Li et al.

(10) Patent No.: US 7,289,464 B2
(45) Date of Patent: Oct. 30, 2007

(54) COMPRESSION USING PROGRAM TOKENS

(75) Inventors: Peng Li, San Diego, CA (US);
Raymond T. Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1003 days.

(21) Appl. No.: 10/368,659

(22) Filed: Feb. 18, 2003

(65) Prior Publication Data

US 2004/0162032 A1 Aug. 19, 2004

(51) Int. Cl.
*H04Q 7/00* (2006.01)
(52) U.S. Cl. .................. 370/328; 370/389; 370/352
(58) Field of Classification Search ................. None
See application file for complete search history.

(56) References Cited

U.S. PATENT DOCUMENTS

| | | | | |
|---|---|---|---|---|
| 6,788,676 B2 * | 9/2004 | Partanen et al. | ............ | 370/352 |
| 6,807,173 B1 * | 10/2004 | Lee et al. | .................. | 370/389 |
| 2002/0057716 A1 * | 5/2002 | Svanbro et al. | ............. | 370/477 |
| 2002/0129236 A1 * | 9/2002 | Nuutinen | .................... | 713/151 |
| 2004/0085949 A1 * | 5/2004 | Partanen et al. | ............ | 370/352 |

* cited by examiner

*Primary Examiner*—Bob A. Phunkulh
(74) *Attorney, Agent, or Firm*—Thomas R. Rouse; Sayed Hossain Beledi; Kristine U. Ekwueme (57) ABSTRACT

Systems and methods for improving performance of communications over a limited-bandwidth communication link by token-based compression of messages. In one embodiment, a mobile station parses an SIP/SDP message into pieces, wherein each piece comprises a static component and a variable component. The static component comprises fixed-format data and may be intermingled with the variable component. The static component is replaced by a corresponding token. In one embodiment, the token comprises a two-byte identifier. The remaining variable component may also be compressed. The compressed message is received by an SIP proxy server that can identify the static component of each piece of the SIP/SDP message from the received token. The SIP proxy server can then replace the two-byte token with the original static component, and reconstruct the message, in which parts of the static component may be intermingled with parts of the variable component.

27 Claims, 7 Drawing Sheets

COMPRESSION USING PROGRAM TOKENS

BACKGROUND OF THE INVENTION

The invention relates generally to the field of telecommunications and more particularly to systems and methods for improving the efficiency of communications such as session initiation protocol messages for setting up voice-over-IP calls wherein these communications are transmitted over limited-bandwidth links, including wireless links between mobile stations and base stations.

Data can be communicated between devices coupled to a network using, e.g., IP addresses. Although, in the past, the data communicated was typically numeric or textual data, systems and methods have been developed for communicating voice data over these same networks. These communications are referred to generally herein as "voice-over-IP" communications.

In order to utilize voice-over-IP communications, it is necessary to set up a voice-over-IP call. Setup of the call is performed using what is known as the session initiation protocol (SIP). SIP is a call set up signaling protocol. SIP messages contain header information which is necessary to set up the call. The payload corresponding to these headers is communicated using the session description protocol (SDP).

Typically, a node that wishes to initiate a voice-over-IP call transmits an SIP message to an SIP proxy server that is part of a wired network. The SIP message is processed by the SIP proxy server, which communicates with another SIP proxy server through the network (e.g., the Internet). The second SIP proxy server then communicates with the destination node to which the call is directed.

In a wired environment (i.e., an environment in which the initiating node, SIP proxy servers, and destination node each communicates with the others via a wired network), there is little difficulty in using SIP and SDP messaging. This is due, in part, to the fact that the wired network connections have relatively high bandwidth and can easily communicate large amounts of data, such as SIP/SDP messages. This is also due, in part, to the fact that wired connections are so reliable that the associated error rate is very low and the SIP/SDP messages can be compressed into relatively few bits.

In a wireless environment, however, this is not the case. In a wireless environment, one or more of the initiating node, SIP proxy servers and destination node communicates with the others via a wireless connection. The communication of SIP/SDP messages in a wireless environment differs in two ways from the wired environment. First, generally speaking, the bandwidth of a wireless connection is substantially less than the bandwidth of a wired connection. As a result, the wireless connection cannot support the transmission of as much data as a wired connection. Second, because the wireless connection is generally less reliable (i.e., has a higher error rate) than a wired connection, it is not possible to transmit the SIP/SDP message in as compressed a form as can be done in a wired environment. Consequently, the SIP/SDP message transmitted over the wireless connection is ASCII-encoded to enable an acceptable error rate to be maintained.

SIP/SDP messages in a wireless environment may therefore comprise hundreds of bytes. They may even have more than a thousand bytes of data. It may therefore take minutes, or even tens of minutes, to complete transmission of the SIP/SDP message and to set up the voice-over-IP call, thereby presenting an unreasonable delay. Because the transmission of SIP/SDP messages over a wireless connection requires a much greater portion of the available bandwidth than in a wired connection, there is a much greater need for a means to make more efficient use of this bandwidth

SUMMARY OF THE INVENTION

One or more of the problems outlined above may be solved by the various embodiments of the invention. Broadly speaking, the invention comprises systems and methods for improving the performance of SIP and SDP data transmissions over a wireless communications link by performing compression using program tokens to minimize the size of the transmitted SIP/SDP messages.

In one embodiment, a mobile station parses an SIP/SDP message into pieces, wherein each piece comprises a static component and a variable component. The static component comprises fixed-format data and may be intermingled with the variable component. The static component is replaced by a corresponding token. In one embodiment, the token comprises a two-byte identifier. The remaining variable component may also be compressed. The compressed message is received by an SIP proxy server that can identify the static component of each piece of the SIP/SDP message from the received token. The SIP proxy server can then replace the two-byte token with the original static component, and reconstruct the message, in which parts of the static component may be intermingled with parts of the variable component. Similar compression and decompression can be performed on messages transmitted from the SIP proxy server to the mobile station.

One embodiment of the invention comprises a method in which a device, such as a mobile station or SIP proxy server, parses an SIP/SDP message into portions, each of which has a static component and a variable component, and then for each portion identifies a format of the static component, selects a token corresponding to the identified format and generates a compressed message corresponding to the data message, wherein the compressed message contains the token corresponding to the static component and data corresponding to the variable component. In one embodiment, the token comprises a two-byte token that identifies corresponding compression and decompression programs tailored to the particular static component with which they are used.

Another embodiment of the invention comprises a software application. The software application is embodied in a computer-readable medium such as a floppy disk, CD-ROM, DVD-ROM, RAM, ROM, database schemas and the like. The computer readable medium contains instructions which are configured to cause a computer to execute a method which is generally as described above. It should be noted that the computer readable medium may comprise a RAM or other memory which forms part of a computer system. The computer system would thereby be enabled to perform a method in accordance with the present disclosure and is believed to be within the scope of the appended claims.

Numerous additional embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the invention comprises systems and methods for improving the performance of voice-over-IP communications in a wireless communication system by minimizing the size of session initiation protocol (SIP) and session description protocol (SDP) messages that must be transmitted over a wireless communication link to set up the voice-over-IP call.

In one embodiment, a mobile station that wishes to initiate a voice-over-IP call generates a SIP/SDP message, compresses the message and transmits the compressed message over a wireless communication link to an SIP proxy server. The SIP proxy server is configured to decompress the compressed SIP/SDP message and then use the uncompressed SIP/SDP message to set up the voice-over-IP call in the normal manner and (i.e., as SIP/SDP messages are conventionally handled in a wired environment). Responses to the mobile station's SIP/SDP message are compressed by the SIP proxy server and transmitted over the wireless link to the mobile station, which then decompresses the message and handles the message in the normal manner. Thus, messages which traverse the wireless communication link are compressed so that the time required to transmit the messages over the link is reduced.

In this embodiment, the compression of a SIP/SDP message is performed by parsing the message into pieces, wherein each piece comprises a static component and a variable component. The static component comprises fixed data in a fixed format (e.g., a header). The static component need not be continuous and may have portions that are intermingled with portions of the variable component, as will be explained in more detail below. The static component is one of a finite set of possible static components and can be replaced by a token that identifies the static component. In one embodiment, the token comprises a two-byte identifier. Because the static component may comprise many bytes, replacing the static component with the corresponding two-byte token provides some compression of that piece of the message. The recipient of the compressed message can then identify the static component of each piece of the SIP/SDP message from the received token. The recipient can therefore not only replace the two-byte token with the original static component, but also properly reconstruct the message which, as noted above, may have parts of the static component intermingled with parts of the variable component.

Figure 1:
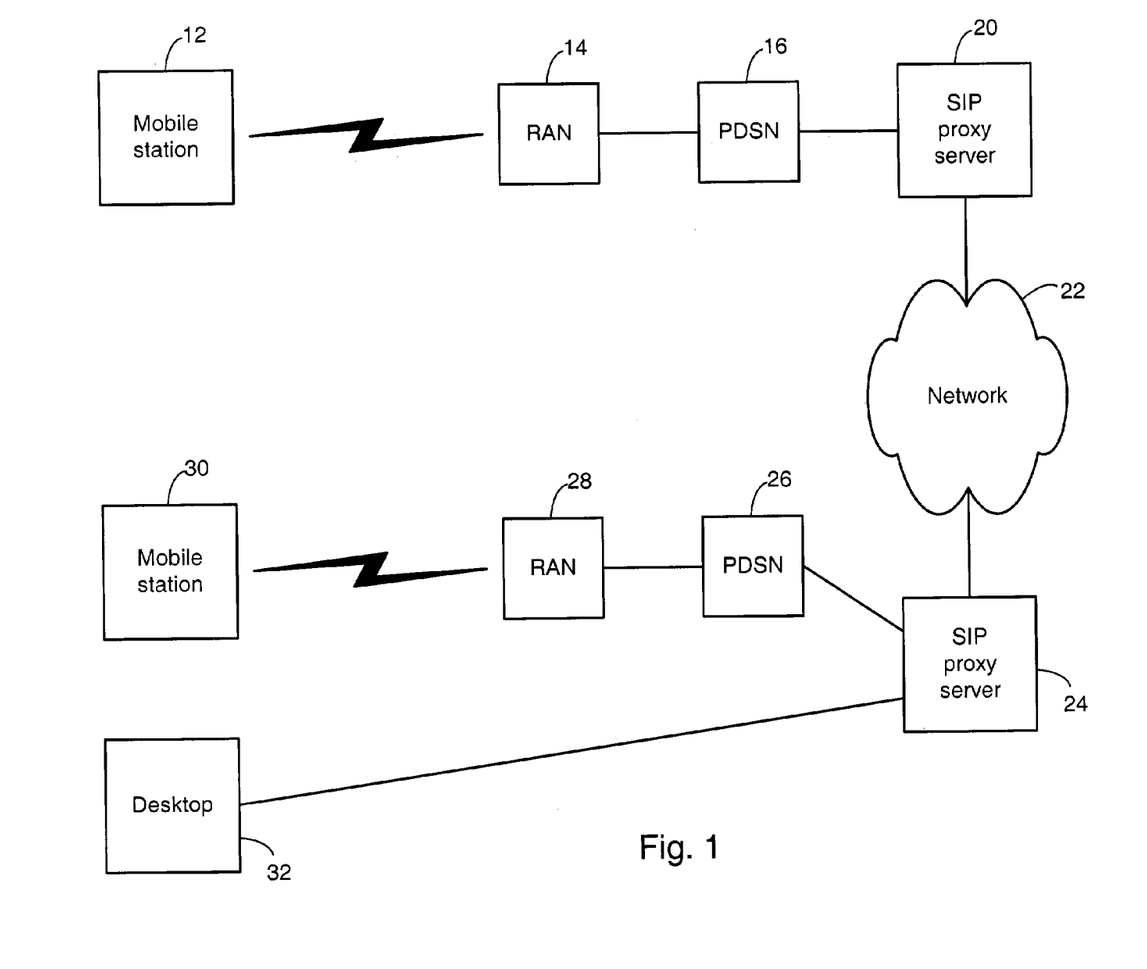
FIG. 1 is a functional block diagram illustrating the structure of one embodiment of a network containing one or more wireless communications links.

Referring to FIG. 1, a functional block diagram illustrating the structure of one embodiment of a network containing one or more wireless communications links is shown. As depicted in the figure, the network includes a mobile station 12 which is coupled via a wireless communication link to a radio access network 14, which is coupled to packet data serving node (PDSN) 16. PDSN 16 is coupled to SIP proxy server 20. In this embodiment, the links between radio access network 14, PDSN 16 and SIP proxy server 20 are wired, rather than wireless. SIP proxy server 20 is coupled to a network 22 (such as the Internet), to which a second SIP proxy server 24 is also coupled. SIP proxy server 24 is coupled to PDSN 26, which is in turn coupled to radio access network 28. Data is communicated from radio access network 28 to mobile station 30 via another wireless communication link. FIG. 1 also depicts a node 32 which is coupled to SIP proxy server 24 via a hardwired connection at (e.g., an ethernet connection).

In the system of FIG. 1, mobile station 12 is the initiator of the voice-over-IP call. Mobile station 12 therefore generates the initial SIP/SDP message, compresses the message, and transmits the message to SIP proxy server 20 (via radio access network 14 and PDSN 16). SIP proxy server then decompresses the message and processes the message in a conventional manner. If the voice-over-IP call is directed to a node such as node 32, which is coupled to SIP proxy server 20 via a hard wired connections, the remainder of the call set up activities (i.e. those between SIP proxy server 20 and destination node 32) will be handled in a conventional manner. If the call is directed to a node such as mobile station 30, which requires that the SIP/SDP message or responses thereto traverse another wireless communication link, communications over the second wireless link may use the same compression methods. It is not required, however, that these methods be implemented for each of the wireless links.

Figure 2:
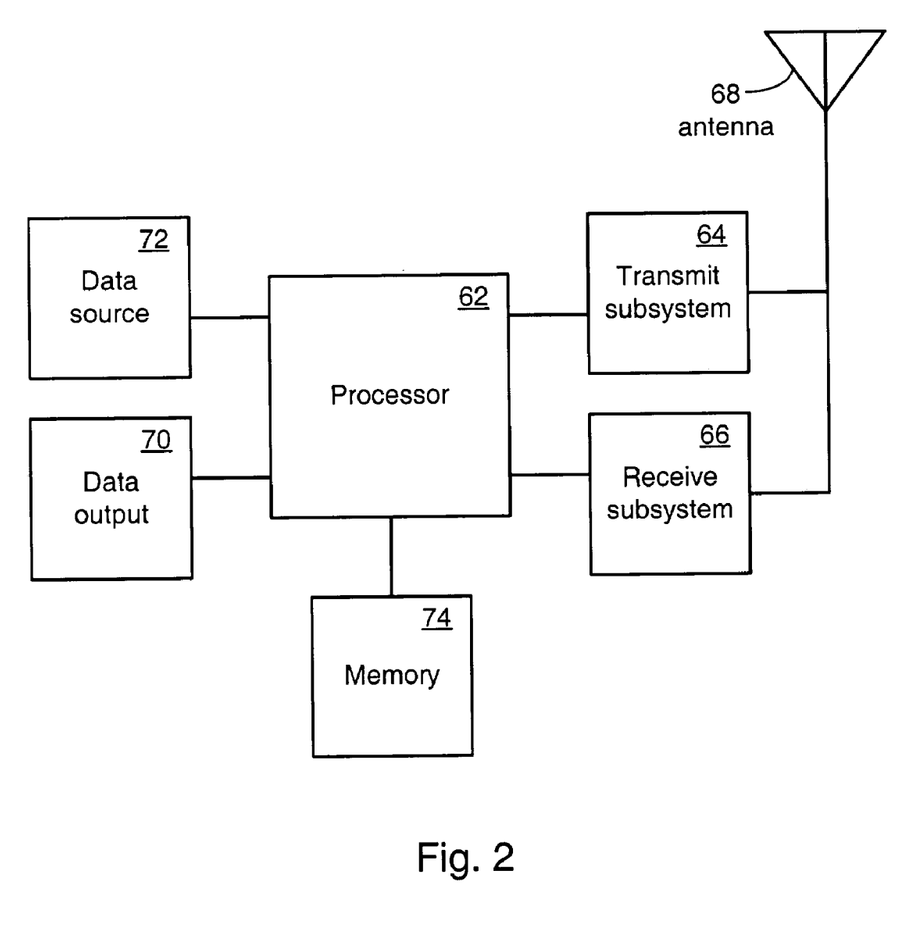
FIG. 2 is a functional block diagram illustrating the structure of a mobile station in one embodiment.

Referring to FIG. 2, a functional block diagram illustrating the structure of a mobile station in one embodiment is shown. In this embodiment, the mobile station comprises a processor 62 coupled to a transmit subsystem 64 and a receive subsystem 66. Memory 74 is coupled to processor 62 for storage of data used by the processor. Transmit subsystem 64 and receive subsystem 66 are coupled to shared antenna 68. Processor 62 receives data from receive subsystem 66, processes the data, and outputs the processed data via output device 70 (e.g., a speaker). Processor 62 also receives data from data source 72 (e.g., a microphone) and processes the data for transmission. The processed data is then forwarded to transmit subsystem 64 for transmission over the reverse link. In addition to processing the data from receive subsystem 66 and data source 72, processor 62 is configured to control the various subsystems of the mobile station. In particular, processor 62 generates and compresses the SIP/SDP message that is conveyed to transmit subsystem 64 for transmission over the wireless link to the SIP proxy server. The mobile station-based functionality described below is implemented in processor 62.

Figure 3:
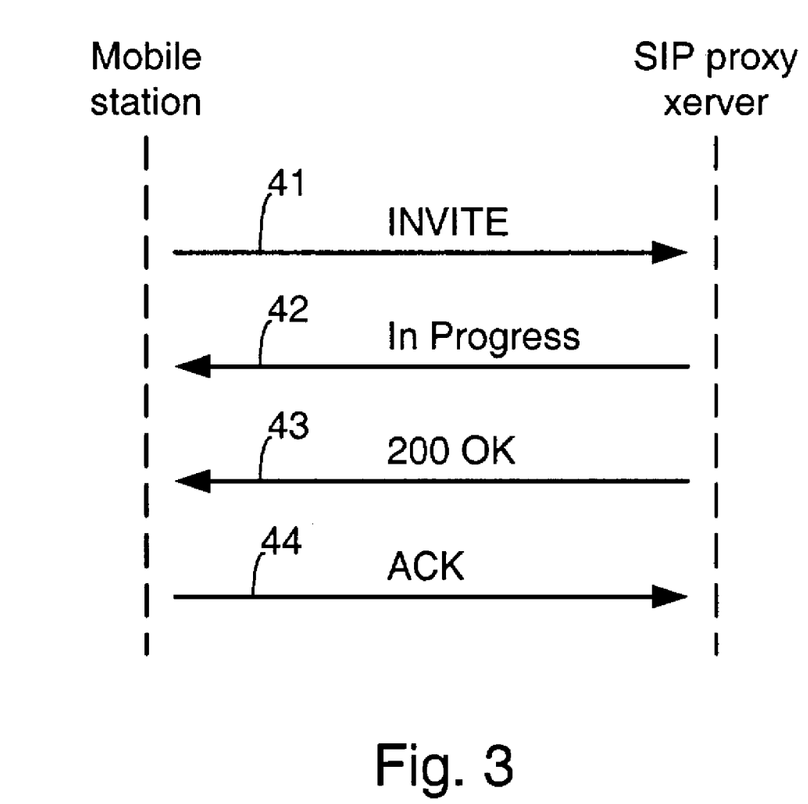
FIG. 3 is a diagram illustrating the communication of messages between a mobile station and a SIP proxy server in accordance with one embodiment.

Referring to FIG. 3, a diagram illustrating the communication of messages between a mobile station and a SIP proxy server is shown. In this figure, messages are shown originating at one of the mobile station (at the left side of the figure) or the proxy server (at the right side of the figure) and terminating at the other (the proxy server or the mobile station, respectively). The purpose of this figure is simply to show that the initiation of a voice-over-IP call comprises an exchange of messages. In this example, initiation of the call begins with a first message 41 from the mobile station to the proxy server. This message is an "INVITE" message that attempts to initiate communications with the proxy server. In response to this message, the proxy server transmits an "in progress" message 42 to the mobile station. The proxy server then transmits a "200 OK" message 43, in response to which the mobile station transmits an acknowledgment ("ACK") message 44 back to the proxy server. This exchange continues until the call is set up and voice-over-IP transmissions can be made. It should be noted that the particular messages shown in the figure are exemplary, and may differ in other embodiments.

Figure 4:
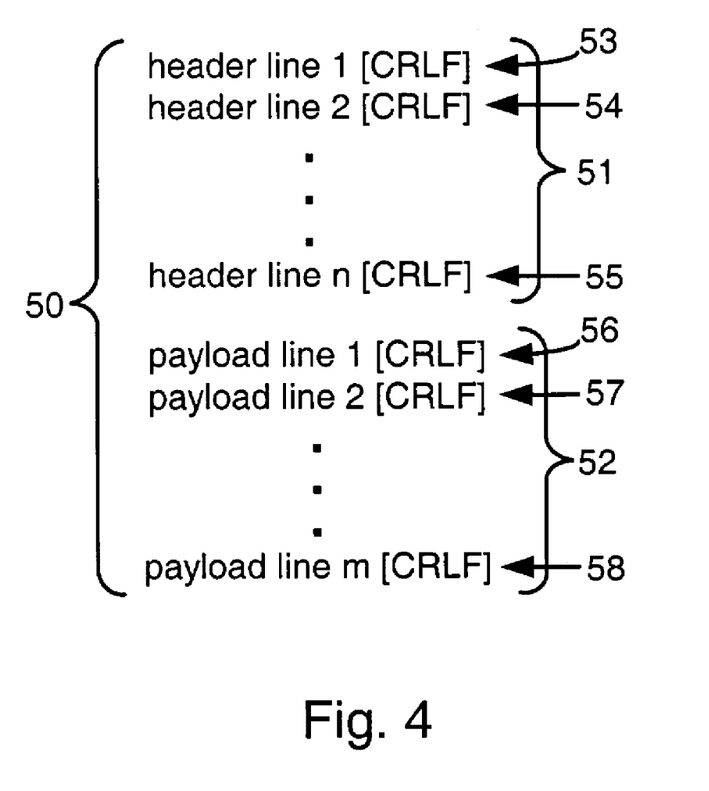
FIG. 4 is a diagram illustrating the general structure of an SIP/SDP message.

Referring to FIG. 4, a diagram illustrating the general structure of an SIP/SDP message is shown. It can be seen from the figure that the message 50 consists of a header portion 51 and a payload portion 52. The header portion 51 is the SIP portion of the message. Header 51 itself consists of multiple individual header lines (e.g., 53, 54). Each line in the header is terminated by a [CRLF] character. After the last line 55 of the header 51, the payload portion 52 of the message begins. This is the SDP portion of the message. Similar to header portion 51, payload portion 52 comprises multiple lines (e.g., 56, 57), each of which is terminated by a [CRLF] character. As noted above, message 50 may comprise hundreds of bytes of data. In some instances, the message may comprise over 1000 bytes.

Figure 5:
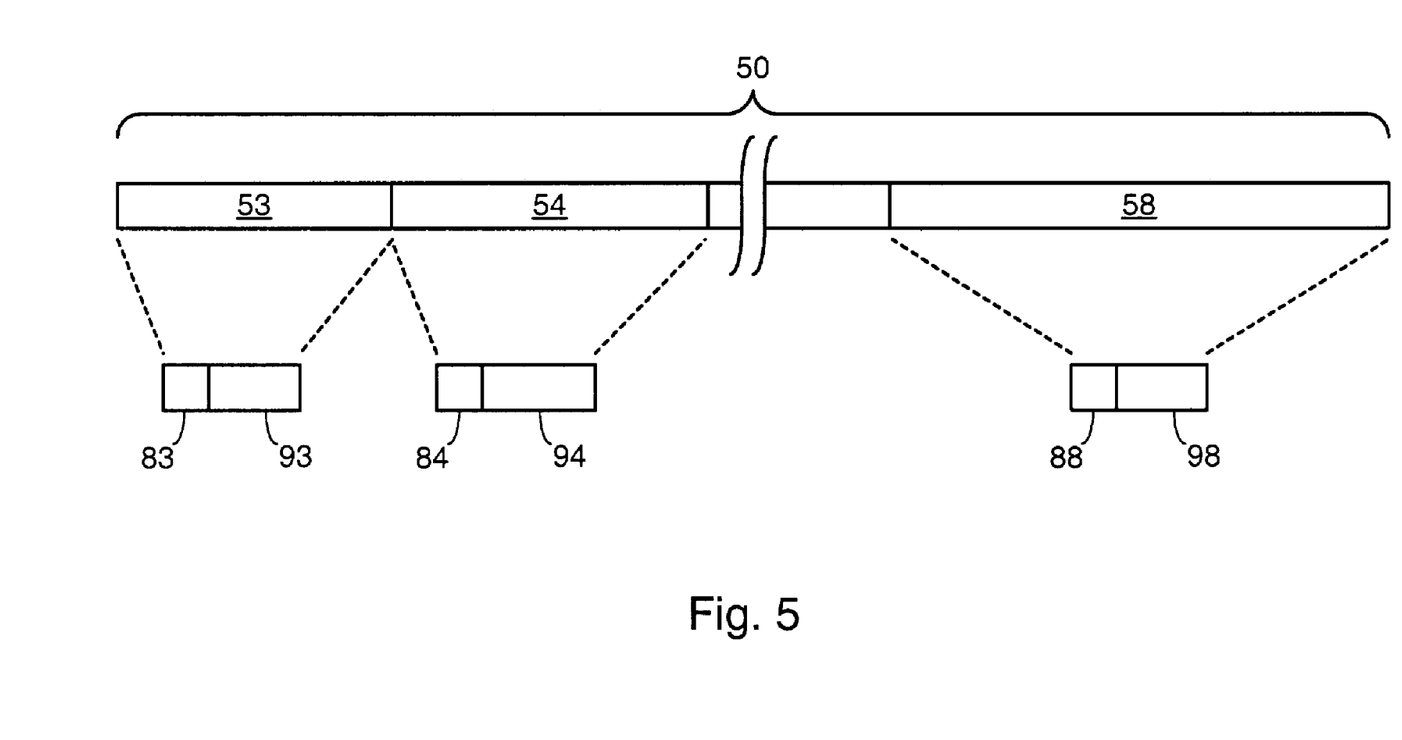
FIG. 5 is a diagram illustrating the structure of an SIP/SDP message and the contiguous sub-strings within the message.

Referring to FIG. 5, it may also be convenient to view SIP/SDP as a continuous string of characters. Individual header lines 53 and 54, and payload line 58 of the message are shown in the figure. These lines form sub-strings of the larger string that comprises the entire message. The lines of message 50 will be referred to below as sub-strings of the message, in part as a reminder that each of the sub-strings generally comprises only a portion of the message, rather than a separate message, and in part because multiple lines may be handled as a unit, as will be described in more detail below.

Each of the sub-strings has one of a set of predetermined formats. These formats essentially comprise a dictionary that is used by the mobile station and proxy server to communicate via SIP/SDP messages. Each of the formats includes a static component and a variable component. The static component is fixed and allows the sub-string to be identified and interpreted. The static component of the sub-string need not be a single, contiguous set of characters, and it need not include the first characters in the sub-string. The static component of the sub-string may comprise multiple, discontinuous pieces of the sub-string. That is, the pieces of the sub-string may not be contiguous, but may instead be interspersed with pieces of the variable component of the sub-string.

The sub-strings comprise fields in the message. The static component of a field is essentially an identifier for the field. The fields are selected from a finite set of fields that are available for use by the mobile station and the proxy server to communicate with each other to set up the voice-over-IP call. These fields comprise sets of ASCII characters. The use of ASCII characters serves two purposes: first, because the transmission of ASCII characters can be performed more reliably than in a wireless environment; and second, because the use of ASCII characters allows the fields to be named using mnemonics for the corresponding actions. For example, the field to invite a [proxy server] to [join] a voice-over-IP call is "INVITE", and the field to acknowledge receipt of a previous message or field is "ACK".

Because the fields in the SIP/SDP message are mnemonics formed by ASCII characters, it takes more bits to communicate them than if simple binary data were used. To illustrate this, if there were four fields, they could be transmitted using only two bits ($2^2$=4). If there were eight fields, they could be transmitted using only three bits ($2^3$=8). If each of the fields comprised only four ASCII characters, it would take 64 bits to communicate one of the commands (4 ASCII characters×16 bits per character). It is therefore possible to compress the fields by mapping the commands to smaller, more efficiently communicated fields. In the example above, where there were only four fields, one of the fields could be mapped to 0, one of the fields could be mapped to 1, one of the fields could be mapped to 2, and the last of the fields could be mapped to 3. This mapping can be extrapolated to meet the needs of other embodiments (i.e., to handle the size of the set of fields).

Using the present systems and methods, however, ASCII strings corresponding to fields within the SIPC/SDP message are not simply mapped to smaller, more efficient fields. As noted above, the sub-strings of the SIPC/SDP message may be discontinuous (i.e., the characters of the static component may be separated by intervening data that is part of the variable component). As a result, it may not be possible to take the entire static component of a sub-string and simply replace it with a smaller piece of data. The present systems and methods therefore identify the static component and then replace the sub-string with a modified sub-string and a token which identifies the static component.

In one embodiment, a mobile station executes a compression program that first parses the SIPC/SDP message into sub-strings. For each of the sub-strings, the application identifies the corresponding static component. Based upon the identification of the static component, the compression program selects a sub-program, PIDx, that is specifically configured to compress sub-strings having the identified static component. The sub-program replaces the sub-string with a token that identifies the program and a modified sub-string corresponding to the variable component.

Referring again to FIG. 5, the compression of each of sub-strings 53, 54 and 58 is shown. Sub-string 53 is compressed to a token 83 and a modified sub-string 93. Similarly, sub-string 54 is compressed to a token 84 and a modified sub-string 94, and sub-string 58 is compressed to a token 88 and a modified sub-string 98.

In this embodiment, the token simply comprises a two-byte identifier. (The two-byte identifier may be considered to identify either the sub-program, or the static component to which the sub-program corresponds.) The modified sub-string essentially comprises the variable component of the original sub-string, formatted to allow it to be easily re-integrated with the static component by a corresponding decompression program. In some instances, however, the variable component may be independently compressed, as will be discussed in more detail below. The sub-program thereby generates a modified sub-string that may be substantially smaller than the original sub-string.

The process of replacing the original sub-string (including the static component and the variable component) with the token and the modified sub-string is repeated for each of the sub-strings in the SIP/SDP message. It should be noted that, in some embodiments, multiple sub-strings (that is, multiple lines) of the SIP/SDP message may be handled as a unit, rather than being handled individually. For example, multiple header lines may frequently occur in a particular order. It may therefore be convenient to treat these header lines as a single sub-string (for which the static component can be compressed to a single token), rather than multiple sub-strings (for which the static components can be compressed to multiple tokens).

As the sub-strings of the original SIP/SDP message are converted to corresponding tokens and modified sub-strings, the tokens and modified sub-strings are combined to form a modified, compressed, SIP/SDP message. This modified in SIP/SDP message is then transmitted over the wireless link from the mobile station to the proxy server.

Figure 6:
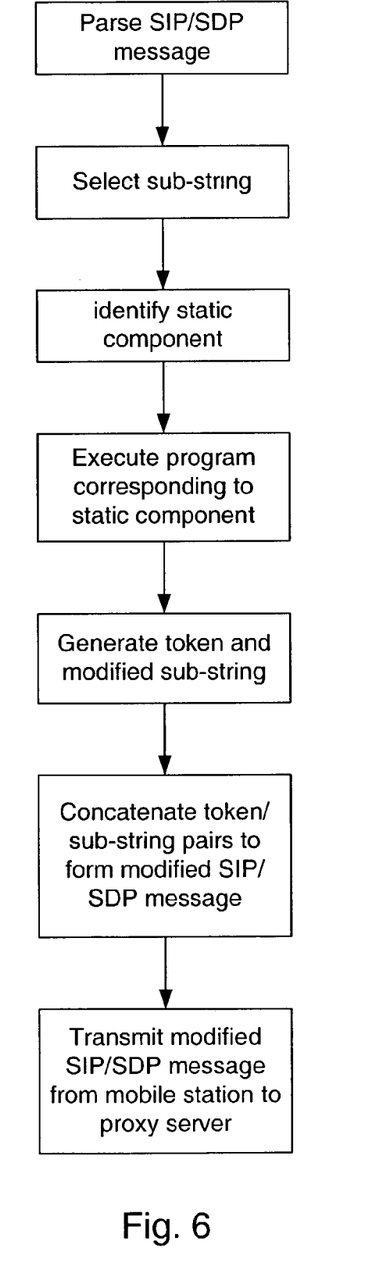
FIG. 6 is a flow diagram illustrating one embodiment of a method implemented by a mobile station for compressing the SIP/SDP message and transmitting it to an SIP proxy server.

The method implemented by the mobile station for compressing the SIP/SDP message and transmitting it to the proxy server is summarized in the flow diagram of FIG. 6.

When the modified SIP/SDP message is received by the proxy server, the proxy server essentially performs the reverse of the same process to reconstruct the original SIP/SDP message from the modified message. In other words, the received modified message is parsed to separate the tokens and corresponding modified sub-strings from each other, then each token and corresponding sub-string is processed by a decompression program (corresponding to the token) which reconstructs the original sub-string from the token and the modified sub-string. The reconstructed sub-strings are then combined to form the original SIP/SDP message, which is then processed normally (i.e., as if the message were being communicated entirely over a wired network).

Figure 7:
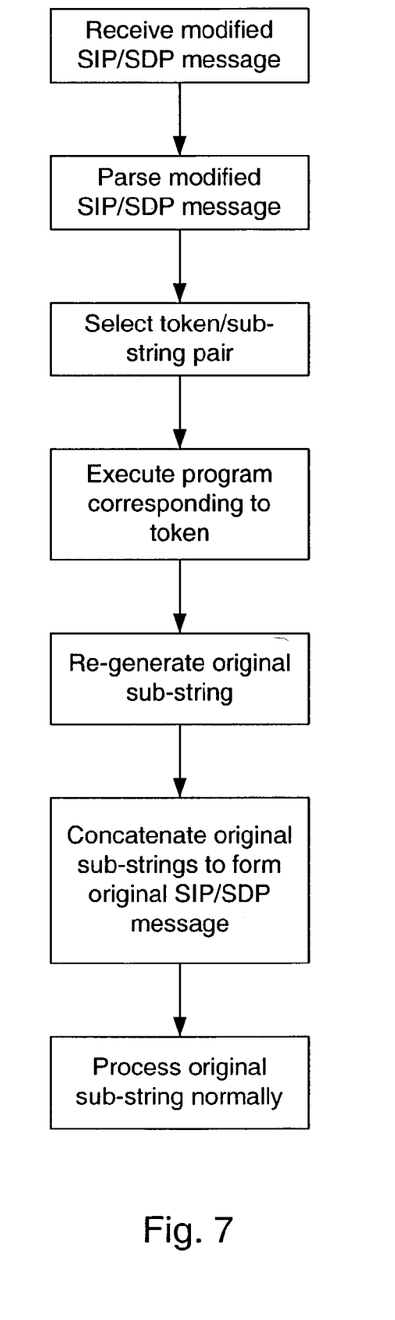
FIG. 7 is a flow diagram illustrating one embodiment of a method implemented by an SIP proxy server for decompressing and handling a SIP/SDP message received from a mobile station.

The method implemented by the proxy server for decompressing and handling the SIP/SDP message received from the mobile station is summarized in the flow diagram of FIG. 7. It should be noted that, although the foregoing description focuses primarily on the compression of the SIP/SDP messages by the mobile station and decompression of the messages by the SIP proxy server, the same methods may be used for transmission of messages in the opposite direction. That is, the methods may be used to compress messages for transmission from the SIP proxy server to the mobile station and to decompress the messages at the mobile station.

It should be noted that, because the length of the modified sub-string (which is based primarily on the original variable component) is variable, there must be some mechanism for determining when the end of the modified sub-string has been reached. In one embodiment, the modified sub-string is terminated with a [CRLF] character. Alternatively, the proxy server may be configured to search for recognizable tokens. When a token is found, the modified sub-string is considered to have terminated just prior to the token. In another alternative embodiment, one or more extra bytes can be included with the token and used to indicate the length of the modified sub-string. Although this alternative is unambiguous, it does add an extra byte or more of overhead for every sub-string.

Although the embodiments of the invention described in detail above, and the following examples comprise improvements in the communication of SIP/SDP messages over a wireless communication link to set up a voice-over-IP call, other embodiments need not be confined to this specific environment. It is contemplated that various embodiments of the invention may be used to improve the efficiency of communications in many different environments in which large amounts of data must be communicated over limited-bandwidth links.

Various examples are provided below to illustrate some of the different ways a sub-string of the original SIP/SDP message may be compressed in accordance with the present disclosure.

In a first example, a sub-string has a discontinuous static component with a single parameter as a variable component. The Command Sequence header "CSeq: # INVITE" appears in an INVITE message. "CSeq: # INVITE" is an example of a sub-string that is parsed out of the message and compressed by an appropriate sub-program. It can be seen that the static component comprises the fixed pieces "CSeq:" and "INVITE". These pieces of the static component are separated by the variable component, #, which represents an ASCII encoding of a decimal number. In one embodiment, the compressed form of the sub-string is given by "[PIDx] #", where [PIDx] is the token corresponding to the compression/decompression programs for "CSeq: # INVITE", and # is the unmodified variable component of the original sub-string.

Another example of a sub-string having a discontinuous static component with a single-parameter variable component is the SDP Media Announcements field, "m=application # udp wb". This sub-string has the fixed sub-strings "m=application 38 and "udp wb", with the variable decimal number represented by # between them. Using he compression described above, this sub-string would be compressed to [PIDy]#, where [PIDy] is the token corresponding to the compression/decompression programs for "m=application # udp wb", and # is the unmodified variable component of the original sub-string.

It should be noted that, in either of the two examples above, the sub-strings could be compressed to [PIDx]#' or [PIDy]#', respectively, where #' is a compressed form of the variable component #. For instance, #' may be a binary representation of the number #.

In a second example, a sub-string has a discontinuous static component with multiple parameters as the variable component. Consider the SDP Media Announcements field, "m=audio #1 RTP/AVP #2 #3". The static component comprises two fixed text strings, "m=audio" and "RTP/AVP", which are separated by a variable string #1. The second of the fixed text strings is then followed by additional variable strings, #2 and #3. In this instance, the sub-string "m=audio #1 RTP/AVP #2 #3" could be compressed to "[PIDx] #1 #2 #3", where [PIDx] is the token corresponding to the compression/decompression programs for "m=audio #1 RTP/AVP #2 #3", and #1, #2 and #3 are the unmodified values of the variable component of the original sub-string.

It should be noted that variable component values #1, #2 and #3 could be compressed to #1', #2' and #3', respectively. #1', #2' and #3' could be binary representations of #1, #2 and #3, or they could be compressed in some other manner. It should also be noted that, while this example includes three separate parameter values in the variable component, other examples could have n separate values.

In a third example, a sub-string has a continuous static component with a variable component that is compressible. Consider the SDP Connection Data field, "c=IN IP4 #address". The static component comprises the fixed string "c=IN IP4", while the variable component comprises #address, where #address is the decimal representation of an IPv4 address. The decimal representation of #address can be as large as 15 ASCII characters (e.g., 101.102.103.104), which is 30 bytes. It is more efficient to represent #address in the binary format comprising 4 bytes, each corresponding to one of the three-digit numbers in the address. For example, 101.102.103.104 is compressed to 0110 0101 0110 0110 0110 0111 0110 1000 (or 0x05060708, in hexadecimal representation). The sub-string "c=IN IP4 #address" can therefore be compressed to "[PIDx]#address'", where [PIDx] is the token corresponding to the compression/decompression programs for "c=IN IP4 #address", and #address' is the compressed value corresponding to #address.

In a fourth example, a sub-string has a discontinuous static component with a variable component that may have repeated values. Consider the SDP Origin field, "o=#username #session-id #version IN IP4 #address". This sub-string has the fixed text strings "[CRLF]o=" and "IN IP4" and the variable values #username, #session-id, #version, and #address. The sub-string #address is the decimal representation of an IPv4 address and can be represented more efficiently in the 4-byte binary representation (see the example above). The sub-strings #session-id and #version are variable decimal values. These values may be compressed by representing them as binary values, as also discussed above. The values #session-id and #version sometimes contain NTP timestamp values, and it is not unusual for these values to be the same. That is, the value of #session-id may be equal to the value of #version. If a value is repeated, the second value can be represented by a special character (e.g., "%") that indicates the repeated value. Thus, the sub-string "o=#username #session-id #version IN IP4 #address" could be compressed to "[PIDx] #username' #session-id' % #address'", where #username", #session-id' and #address' are the compressed values corresponding to #username, #session-id and #address, respectively.

In a fifth example, a sub-string includes multiple lines of the SIP/SDP message. Consider the five mandatory SIP headers which have the following general format.

Via: [parameters] [CRLF]
To: [parameters] [CRLF]
From: [parameters] [CRLF]
Call-ID: [parameters] [CRLF]
CSeq: [parameters] [CRLF]

Because these header lines are mandatory, they can be treated as a single sub-string, rather than as five individual, independent sub-strings. All five of the header lines can be compressed to a PID value followed by the Via parameters, followed by [CRLF], followed by the To parameters, followed by [CRLF], and so on. As a result, the 30-byte mandatory SIP header names are compressed to a two-byte token. The parameters can also be compressed as discussed above.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method comprising:
   establishing a wireless communication link between a mobile station and a base station;
   generating a compressed version of the session initiation protocol message;
   transmitting the compressed version of the session initiation protocol message over the communication link; and
   decompressing the compressed version of the session initiation protocol message;
   wherein compressing the session initiation protocol message comprises,
      for each of a plurality of portions of the session initiation protocol message, each portion of the session initiation protocol message containing a static component and a variable component, identifying a format of the static component, selecting a token corresponding to the identified format, and generating a compressed version of the portion of the session initiation
         protocol message containing the token corresponding to the static component and data corresponding to the variable component, and
      concatenating the plurality of compressed versions of the portions of the session initiation protocol message; and
   wherein decompressing the compressed version of the session initiation protocol message comprises,
      for each of the plurality of portions of the compressed version of the session initiation protocol message, identifying the token, and
      reconstructing the corresponding portion of the session initiation protocol message based on the token and the data corresponding to the variable component, and
      concatenating the plurality of reconstructed portions of the session initiation protocol message.

2. A method for compressing data comprising:
   selecting a portion of a data message, wherein the portion of the data message includes a static component and a variable component;
   identifying a format of the static component;
   selecting a token corresponding to the identified format; and
   generating a compressed message corresponding to the data message, wherein the compressed message contains the token corresponding to the static component and data corresponding to the variable component.

3. The method of claim 2, wherein the data message comprises a session initiation protocol message.

4. The method of claim 2, wherein generating the compressed message comprises compressing the variable component to produce the data corresponding to the variable component.

5. The method of claim 2, wherein the static component is discontinuous.

6. The method of claim 2, wherein the variable component comprises a single parameter.

7. The method of claim 2, wherein the variable component comprises multiple parameters.

8. The method of claim 7, wherein at least one of the multiple parameters comprises a repeated value.

9. The method of claim 2, wherein the selected portion of the data message comprises multiple lines of the data message.

10. The method of claim 2, further comprising transmitting the compressed message over a wireless communication link between a mobile station and a proxy server.

11. The method of claim 2, further comprising decompressing the compressed message to reconstruct the data message.

12. A system comprising:
a transmit subsystem; and
a processor coupled to the transmit subsystem;
wherein the processor is configured to
select a portion of a first data message, wherein the portion of the first data message includes a first static component and a first variable component,
identify a first format of the first static component,
select a first token corresponding to the first identified format,
generate a first compressed message corresponding to the first data message, wherein the first compressed message contains the first token corresponding to the first static component and data corresponding to the first variable component, and
convey the first compressed message to the transmit subsystem.

13. The system of claim 12, further comprising a proxy server coupled to the transmit subsystem via a wireless communication link and configured to receive the compressed message from the transmit subsystem.

14. The system of claim 13, wherein the proxy server is configured to receive the first compressed message,
identify the first token and data corresponding to the first variable component, and
generate the portion of the first data message from the first token and data corresponding to the first variable component.

15. The system of claim 14,
wherein the proxy server is further configured to
select a portion of a second data message, wherein the portion of the second data message includes a second static component and a second variable component,
identify a second format of the second static component,
select a second token corresponding to the second format,
generate a second compressed message corresponding to the second data message, wherein the second compressed message contains the second token corresponding to the second static component and data corresponding to the second variable component, and
convey the second compressed message to a receive subsystem coupled to the processor, and
wherein the processor is configured to
identify the second token and data corresponding to the second variable component, and
generate the portion of the second data message from the second token and data corresponding to the second variable component.

16. The system of claim 12,
further comprising a receive subsystem coupled to the processor,
wherein the receive subsystem is configured to receive a second compressed message and to convey the second compressed message to the processor, and
wherein the processor is configured to identify the second token and data corresponding to the second variable component, and generate the portion of the second data message from the second token and data corresponding to the second variable component.

17. The system of claim 12, wherein the a transmit subsystem and the processor comprise components of a mobile station that is coupled to a wireless communication network.

18. The system of claim 12, wherein the first data message comprises a session initiation protocol message.

19. The system of claim 12, wherein generating the first compressed message comprises compressing the first variable component to produce the data corresponding to the first variable component.

20. The system of claim 12, wherein the first static component is discontinuous.

21. The system of claim 12, wherein the first variable component comprises a single parameter.

22. The system of claim 12, wherein the first variable component comprises multiple parameters.

23. The system of claim 22, wherein at least one of the multiple parameters comprises a repeated value.

24. The system of claim 12, wherein the selected portion of the first data message comprises multiple lines of the first data message.

25. The system of claim 12, further comprising transmitting the first compressed message over a wireless communication link between a mobile station and a proxy server.

26. The system of claim 12, further comprising decompressing the first compressed message to reconstruct the first data message.

27. A computer readable medium storing a plurality of instructions readable by a data processor, wherein the instructions are configured to cause the data processor to perform the method comprising:
selecting a portion of a data message, wherein the portion of the data message includes a static component and a variable component;
identifying a format of the static component;
selecting a token corresponding to the identified format; and
generating a compressed message corresponding to the data message, wherein the compressed message contains the token corresponding to the static component and data corresponding to the variable component.

* * * * *